United States Patent
Cox et al.

(10) Patent No.: US 6,885,759 B2
(45) Date of Patent: Apr. 26, 2005

(54) CALIBRATION SYSTEM FOR VISION-BASED AUTOMATIC WRITING IMPLEMENT

(75) Inventors: Cory W Cox, Hillsboro, OR (US); Philip R Lantz, Cornelius, OR (US)

(73) Assignee: Intel Corporation, Santa Clara, CA (US)

( * ) Notice: Subject to any disclaimer, the term of this patent is extended or adjusted under 35 U.S.C. 154(b) by 761 days.

(21) Appl. No.: 09/822,922

(22) Filed: Mar. 30, 2001

(65) Prior Publication Data

US 2002/0141616 A1 Oct. 3, 2002

(51) Int. Cl.$^7$ .................................................. G06K 9/00
(52) U.S. Cl. ........................ 382/103; 382/106; 382/151; 382/153; 382/314; 348/169; 348/175
(58) Field of Search .................................. 382/103, 106, 382/151–153, 186, 313–315, 187–189; 348/169, 113, 116, 170, 171, 175; 356/3; 235/411

(56) References Cited

U.S. PATENT DOCUMENTS

| | | | | |
|---|---|---|---|---|
| 5,484,219 A | * | 1/1996 | Drew et al. ................... 403/57 |
| 5,521,829 A | * | 5/1996 | Jeon ........................... 700/161 |
| 5,579,444 A | * | 11/1996 | Dalziel et al. .............. 700/259 |
| 6,044,165 A | * | 3/2000 | Perona et al. ............... 382/103 |
| 6,249,591 B1 | * | 6/2001 | Tullis ........................ 382/106 |
| 6,681,151 B1 | * | 1/2004 | Weinzimmer et al. ...... 700/259 |
| 6,710,847 B1 | * | 3/2004 | Irie ............................. 355/53 |
| 6,741,738 B1 | * | 5/2004 | Taylor ........................ 382/187 |
| 2002/0056576 A1 | * | 5/2002 | Ericson ................... 178/18.01 |
| 2002/0071602 A1 | * | 6/2002 | Nakano et al. ............ 382/151 |

\* cited by examiner

*Primary Examiner*—Kanjibhai Patel
*Assistant Examiner*—Ali Bayat
(74) *Attorney, Agent, or Firm*—Sharmini N. Green

(57) ABSTRACT

A calibration system for a vision-based automatic writing implement is disclosed. The automatically controlled writing implement is appended to an articulated robot arm. The writing implement draws or writes on a substrate and recognizes what a user draws or writes on the same substrate. The user may move the substrate while drawing, thereby confusing the drawing and recognition processes. Accordingly, a controller draws a target on the substrate initially. Before each drawing or recognition step, the controller uses a digital video camera to find and recognize the target and determine whether the substrate has moved. The target is asymmetrical, such that the controller can determine the orientation as well as the position of the substrate. The controller can then orient its drawing and recognition algorithms to the new location and orientation of the substrate.

22 Claims, 6 Drawing Sheets

CALIBRATION SYSTEM FOR VISION-BASED AUTOMATIC WRITING IMPLEMENT

BACKGROUND

1. Field of the Invention

Embodiments described herein are directed to an automatically controlled writing implement with a digital camera, which draws or writes on a substrate and recognizes what a user draws or writes on that same substrate.

2. Related Art

Both interactive systems and non-interactive systems that use controllers to recognize a target are known in the art. For example, U.S. Pat. No. 5,901,978, entitled "Method and Apparatus for Detecting the Presence of a Child Seat," teaches a method and system for detecting the presence of a child seat, more particularly to a method and apparatus for detecting the presence of a child seat in a rear-facing position, on a seat in which information about its contents is obtained and a signal is generated based on any contents of the seat. The analysis of the signal is preferably by pattern recognition techniques that can recognize and thus identify the contents of the seat.

U.S. Pat. No. 5,919,045, entitled "Interactive Race Car Simulator System," discloses an interactive vehicle simulator system that receives input signals indicative of the actions of a user who is located in a driver module. The simulator system also displays images and moves the driver module in accordance with the input signals.

U.S. Pat. No. 6,026,798, entitled "Professional Batting Training Machine," discloses a baseball pitching machine employing a counter-rotating wheel type baseball launch subsystem that pitches a series of baseballs as well as a computer controlled system for selecting the type and percentage of pitches, pitcher and batter characteristics, strike zone areas, and other parameters to provide a meaningful batting training session.

U.S. Pat. No. 6,188,484, entitled "Method and Apparatus for Measuring Angular Displacement of an Actuator Arm Relative to a Reference Position," further teaches an apparatus for measuring directly an angular displacement of an actuator arm relative to a reference position, wherein the actuator is rotatable about a fixed axis.

The above-referenced examples are useful in their particular fields, such as for child safety, recreation, improvement of sports skills, and the like. The technology of recognizing a target may also be employed in interactive games. Using a digital video camera for the purpose of detecting substrate movement, an automatically controlled pen may draw or write on a substrate and recognize what a user draws or writes on the same substrate. Problems may arise since the user may move the substrate while drawing, thereby confusing the drawing and recognition processes. To alleviate this problem, a controller draws a specialized asymmetrical target on the substrate initially. Before each drawing, the controller uses the camera to find and recognize the target and determine the orientation as well as the position of the substrate. This allows for interactive games such as tic-tac-toe, hangman, and the like to be played.

BRIEF DESCRIPTION OF THE DRAWINGS

In order that all of the structural and functional features for attaining the objects of the Calibration System for Vision-Based Automatic Writing Implement may be readily understood, a detailed description of embodiments of the invention will be made with reference to the accompanying drawings, wherein like numerals designate corresponding parts in the several figures.

DETAILED DESCRIPTION

Figure 3:
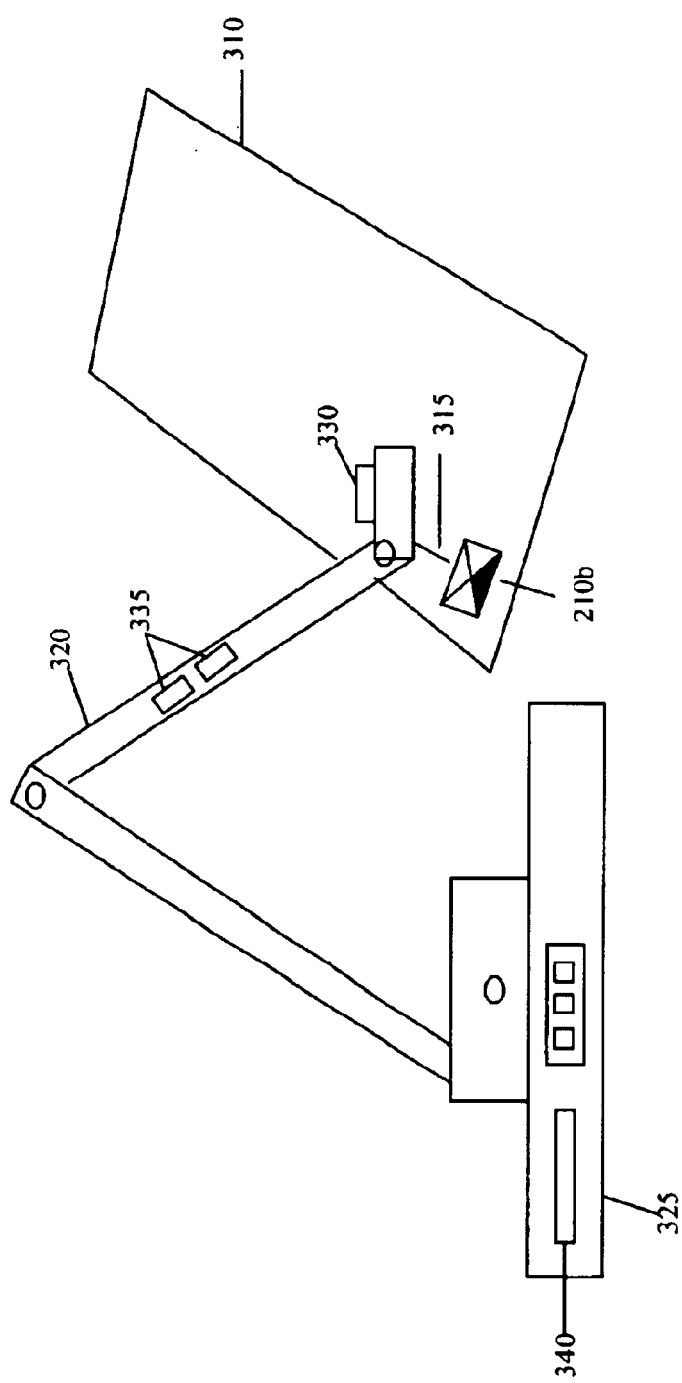
FIG. 3 depicts a drawing of a specialized target on a blank substrate with the use of an automatically controlled writing implement.

The following paragraphs describe a calibration system for a vision-based writing implement according to an embodiment of the present invention. According to one embodiment of the present invention, as illustrated in FIG. 3, an articulated robot arm 320, secured to a base 325, has software-controlled mechanical actuators and sensors 335 and a digital video camera 330 appended to it. The digital video camera 330 may also be mounted in some other way, such as on a tower mounted to the base 325 of the articulated robot arm 320. An automatically controlled writing implement 315 draws or writes on a substrate 310. The substrate 310 may be a sheet of paper, a blackboard, a whiteboard, or the like. Through the use of the digital video camera 330, the system recognizes what a user draws or writes on the same substrate 310. It is assumed that the substrate 310 does not move while the automatic writing implement 315 is drawing. The user, of course, may move the substrate 310 while drawing or writing, thereby confusing the drawing and recognition processes.

Figure 1:
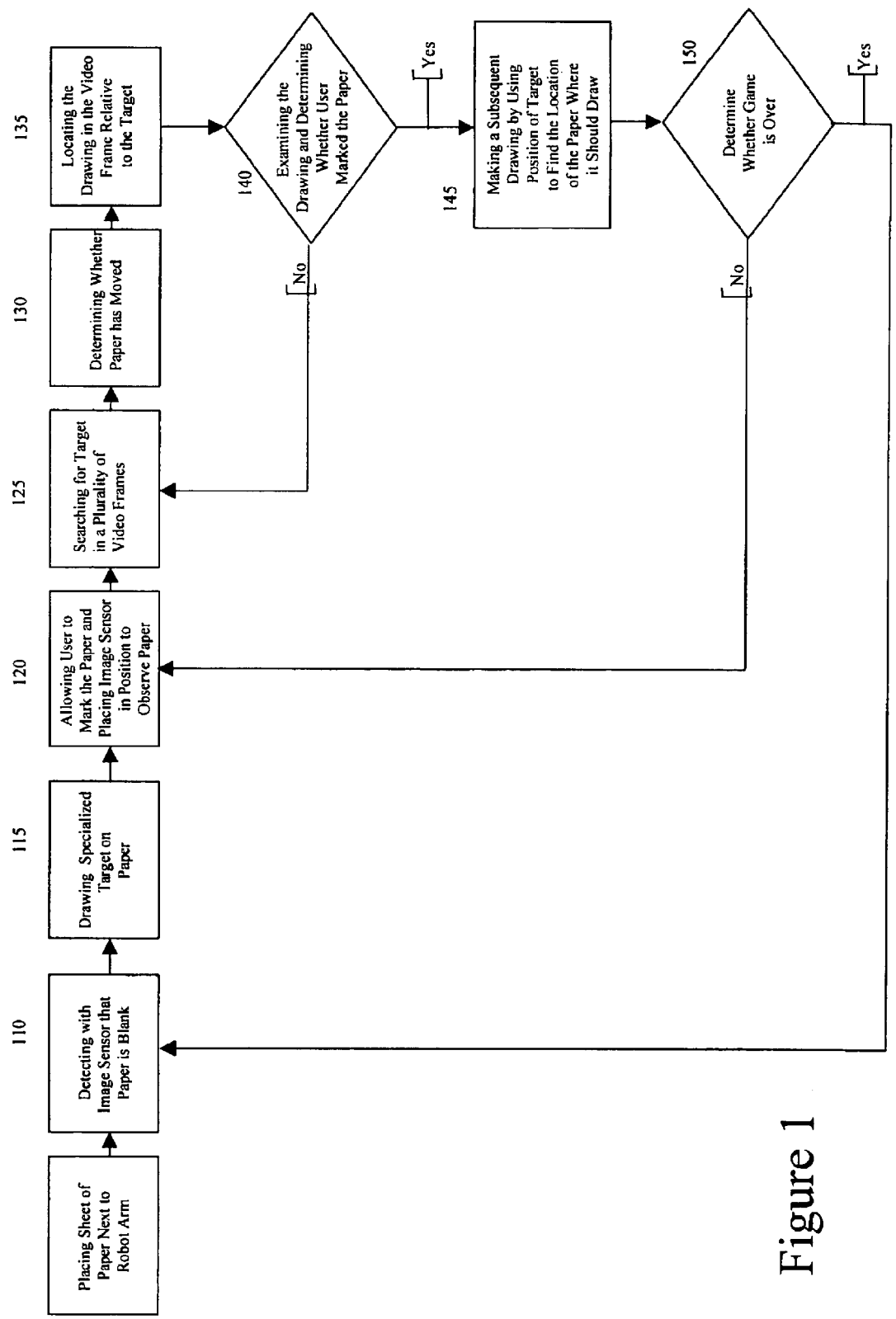
FIG. 1 is a flow chart illustrating the steps associated with a system for detecting substrate movement.
Figure 6:
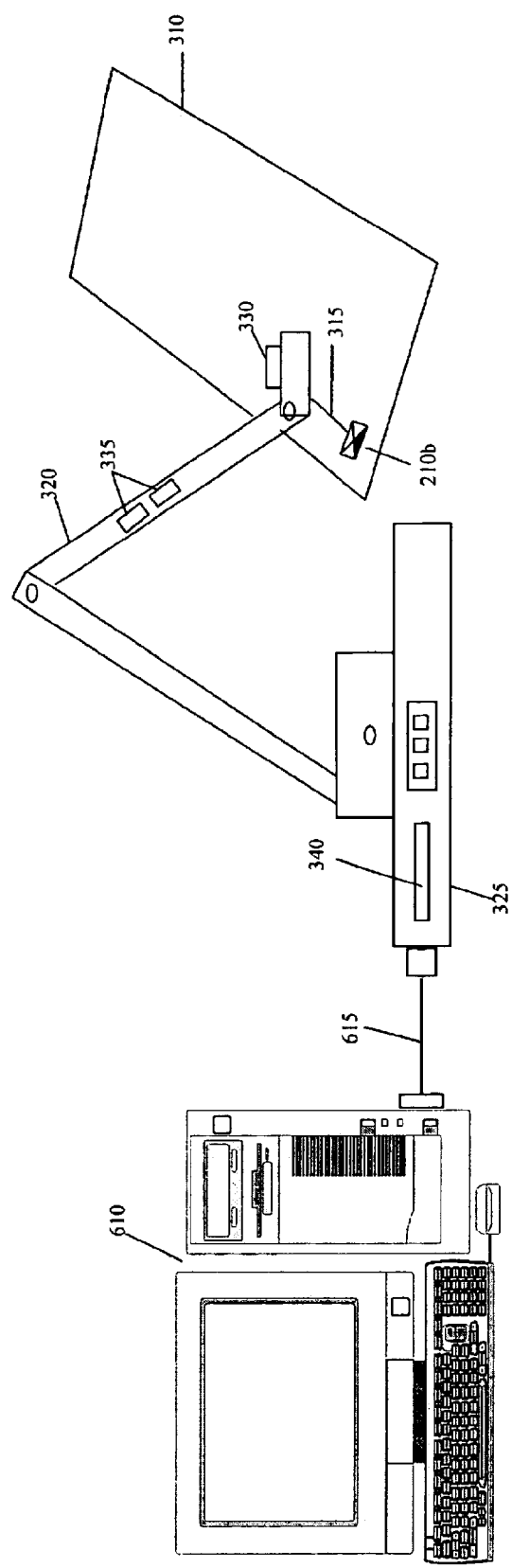
FIG. 6 depicts a computer interfaced to the base of an articulated robot arm.

FIG. 1, together with FIG. 3, illustrates the overall operation of a calibration system for a vision-based automatic writing implement according to an embodiment of the present invention. As an example, the system may engage in an interactive game of tic-tac-toe with a user. The game may be pre-loaded into the system through an applicable CD ROM disk drive or floppy disk drive 340. The game may further be built into the system. Moreover, the game may be located on a separate computer 610, as shown in FIG. 6. In such a case, the articulated robot arm 320 would provide sensor data to the computer 610 and the game itself would run on the computer 610.

The user places a blank substrate 310 in proximity to the articulated robot arm 320. A base 325 supports the articulated robot arm 320. The articulated robot arm 320 is capable of picking up and holding small objects, namely an automatically controlled writing implement 315. The writing implement 315 may be a pen, pencil, marker, crayon, piece of chalk, or the like. The arm 320 is of such a size and type to be suitable for a child of approximately eight years of age. Appended to the articulated robot arm 320, in this embodiment, is a digital video camera 330. The digital video camera 330 sends video to the controller of the computer 610. The computer 610 is connected to the apparatus via an appropriate serial or parallel interface 615. Wireless connection is also possible. The controller may further be built into the apparatus such as in the articulated robot arm 320 or in the base 325. Moreover, parts of the controller may be located within the apparatus such as in the articulated robot arm 320 or in the base 325, and other parts of the controller may be located in a separate computer 610. The digital video camera 330 is similar in operation to a personal computer camera sold by Intel Corporation such as the Intel® Easy PC Camera, Intel® Deluxe PC Camera, Intel® Pro PC Camera, or Intel® Pocket PC Camera.

Figure 2B:
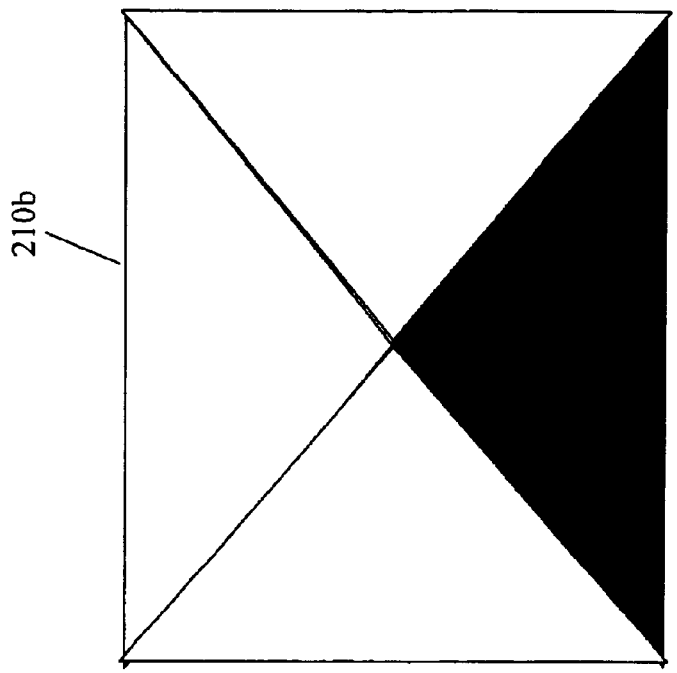
FIG. 2b depicts a specialized target in the form of a square.
Figure 2A:
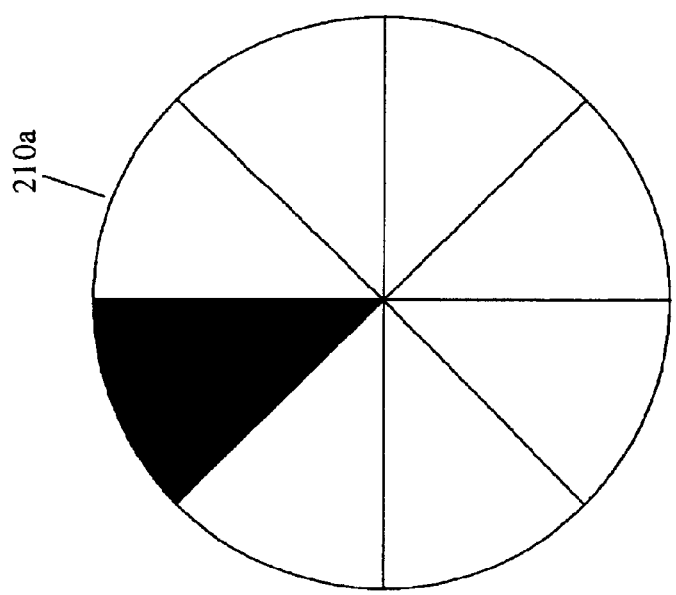
FIG. 2a depicts a specialized target in the form of a circle.
Figure 4:
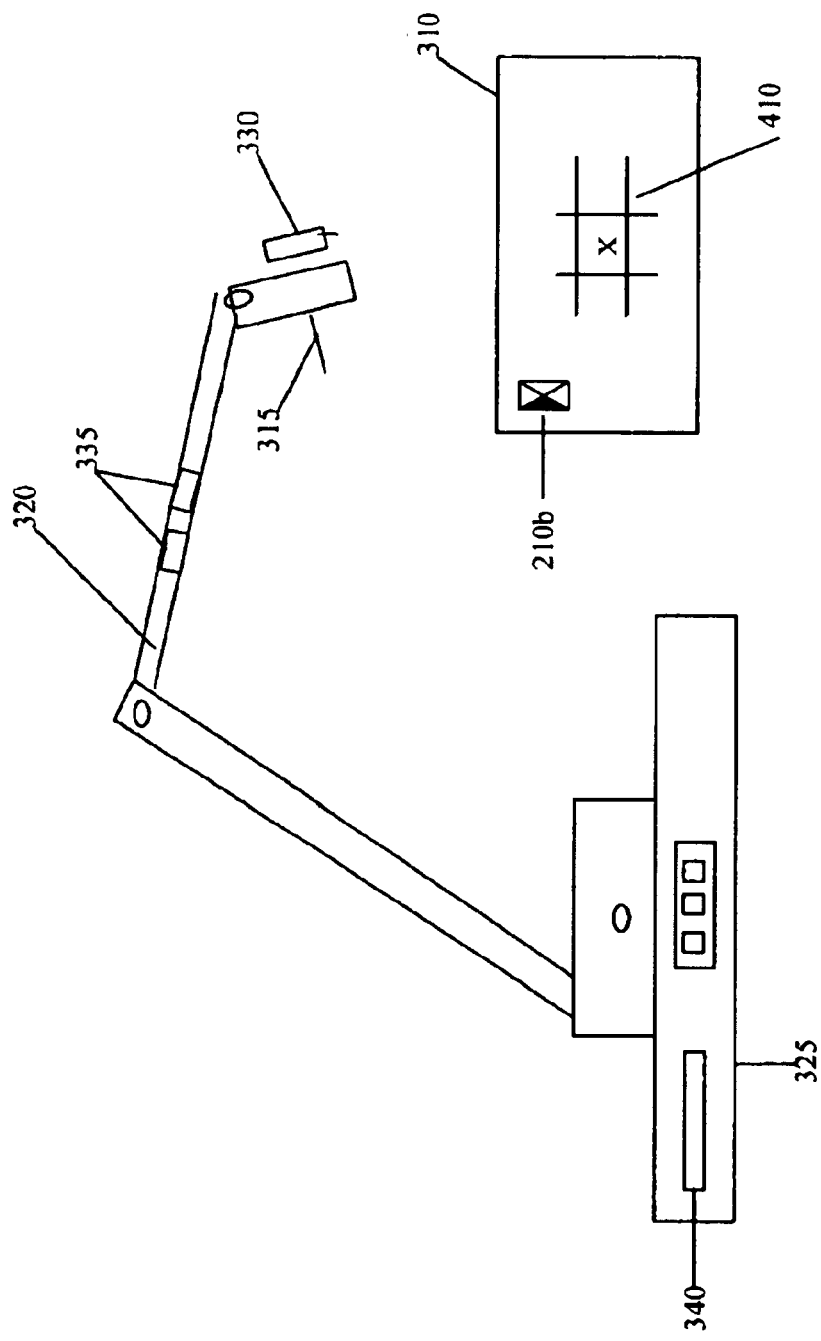
FIG. 4 depicts a digital video camera observing the target drawn on the substrate.

The system, using the digital video camera 330, recognizes that the substrate 310 is blank, as represented by step 110. The digital video camera 330 acts as an image sensor for the system. Next, the automatically controlled writing implement 315 is employed by the system to draw a specialized target 210b on the substrate 310, as shown in step 115 and illustrated in FIG. 3. FIG. 2a depicts a specialized target 210a in the form of a circle. FIG. 2b depicts another specialized target 210b in the form of a square. The specialized target 210 may be of a wide variety of shapes. At this stage, the writing implement 315 may also draw the tic-tac-toe board 410, as shown in FIG. 4, as well as make the first play by placing either an "X" or an "O" in one of the nine squares. The system observes and remembers the relative positions and orientations of the specialized target 210b and the drawing, here the tic-tac-toe board 410.

The user is then allowed to make a move on the game board 410. While the user is marking the substrate 310, the digital video camera 330 is placed in such a position to observe the substrate 310, as illustrated by step 120. In each video frame, as provided by the digital video camera 330 to the controller of the computer 610, the system searches for the specialized target 210b, as shown by step 125. The result of this search includes both the location of the specialized target 210b in the video frame and its orientation. That is, the controller uses the digital video camera 330 to find and recognize the specialized target 210b and to determine whether the substrate 310 has moved, as shown by step 130. The target 210b is asymmetrical, thereby allowing for the determination of the orientation and location of the substrate 310. Software analysis by way of pattern matching occurs in determining whether the substrate 310 has rotated. The controller can then orient its drawing and any recognition algorithms to the new location and orientation of the substrate 310, if the substrate 310 has indeed moved. The necessary software may be loaded into the apparatus itself. It may further be installed on the computer 610 and downloaded.

If the system finds the specialized target 210b, it then locates the drawing, here the tic-tac-toe board 410, in the video frame relative to the specialized target 210b, as illustrated in step 135. By examining the tic-tac-toe board 410 in the video frame, the system determines whether the user marked the substrate 310, as represented by step 140. The system repeats steps 125, 130, 135, and 140 until the system determines that the user has marked the substrate 310, i.e. made a move on the tic-tac-toe board 410.

At this time, the interactive system proceeds to make its own move, using the position of the specialized target 210b to find the location of the substrate 310 where it should draw. This process is shown as step 145. The calibrations system then determines whether the game is completed, as illustrated in step 150. If the game has not reached completion, the system returns to step 120 of allowing the user to make another marking on the substrate 310. The entire process continues until the game is completed. If the game has reached completion, the system returns to step 110. The same process would take place for any other kind of interaction that the system might perform. As suggested above, hangman is another viable option whereby the system would draw the blanks, and the user would fill in the blanks with letters of the alphabet. The system, which is pre-programmed with the final pattern, would also draw an limb of a person's body each time that the user incorrectly placed a letter in a blank. It should be appreciated that tic-tac-toe and hangman are not the only interactive games that a user may play with the system. They are named merely for illustrative purposes.

Figure 5:
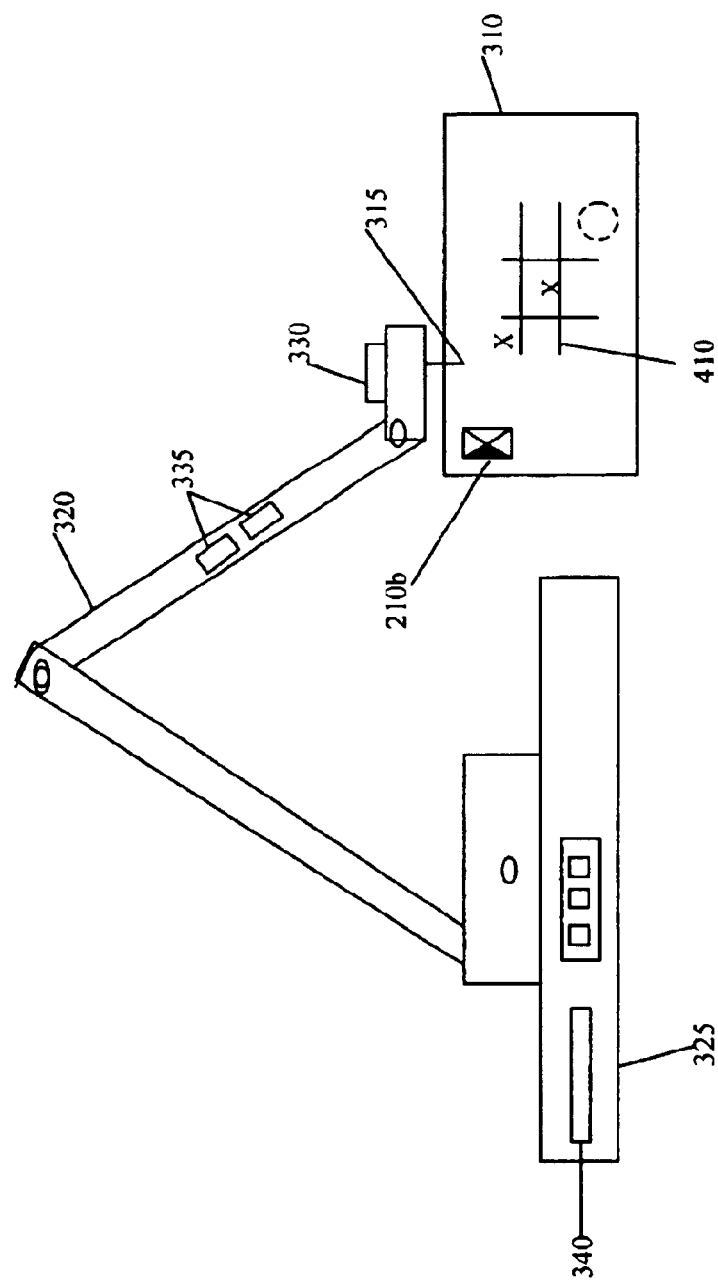
FIG. 5 depicts the drawing on the substrate by the automatically controlled writing implement based on the position and orientation of the substrate.

FIG. 5 illustrates the drawing on the substrate 310, by the automatically controlled writing implement 315 based on the position and orientation of the observed specialized target 210b. In this drawing configuration, the controller cannot observe the specialized target 210b. The controller has, however, already determined where it should draw by observing the position of the target 210b. As illustrated here, the system has already drawn the tic-tac-toe board 410, made a move by placing an "X" in the middle square, allowed the user to mark the substrate 310, as represented by the dotted "O", observed the substrate 310, searched for the specialized target 210b in a plurality of video frames, determined whether the substrate 310 moved, located the drawing in the video frame relative to the specialized target 210b, and examined the drawing and determined that the user in fact marked the substrate 310 with an "O." As such, FIG. 5 corresponds to step 145 in FIG. 1, whereby the system makes a subsequent drawing, here the second "X" by using the position of the specialized target 210b to find the location of the substrate 310 where it should draw.

While the above description refers to particular embodiments of the present invention, it will be understood to those of ordinary skill in the art that modifications may be made without departing from the spirit thereof. The accompanying claims are intended to cover any such modifications as would fall within the true scope and spirit of the present invention.

The presently disclosed embodiments are therefore to be considered in all respects as illustrative and not restrictive; the scope of the invention being indicated by the appended claims, rather than the foregoing description. All changes that come within the meaning and range of equivalency of the claims are therefore intended to be embraces therein.

What is claimed is:

1. A method to detect substrate movement, the method comprising:
   detecting with an image sensor that a substrate is blank;
   drawing a specialized target on the substrate; and
   using the image sensor to find and recognize the target.

2. The method of claim 1, wherein the image sensor is placed in a position where it can observe the substrate while a user is marking the substrate.

3. The method of claim 2, wherein the image sensor searches for the target in a plurality of video frames.

4. The method of claim 3, wherein a determination as to whether the substrate moved is made.

5. The method of claim 4, wherein the relative positions of the target and a drawing on the substrate are remembered, and this information is used to locate the drawing in the video frame is located relative to the target.

6. The method of claim 5, wherein the drawing in the video frame is examined for determining whether the user marked the substrate.

7. The method of claim 6, wherein a subsequent drawing is made by using the position of the target to find the location of the substrate suitable for drawing.

8. The method of claim 7, wherein the process beginning with allowing the user to mark the substrate is repeated.

9. The method of claim 6, wherein the steps of searching for the target in a plurality of video frames, determining whether the substrate moved, locating the drawing in the video frame relative to the target, and examining the drawing in the video frame are repeated until a determination that the user marked the substrate is made.

10. The method of claim 1, wherein the image sensor is a digital video camera.

11. The method of claim 1, wherein a controller draws the specialized target on the substrate.

12. The method of claim 1, wherein the target is asymmetrical to enable the controller to determine the orientation and position of the substrate.

13. A computer readable medium having computer readable instructions encoded thereon for:

drawing a specialized target on a blank substrate;

determining the orientation and the position of the substrate;

receiving video data from a digital video camera;

performing a frame-by-frame analysis on the data to detect the presence of the specialized target, the frame-by-frame analysis being performed in a plurality of video frames;

performing the frame-by-frame analysis on the plurality of video frames to detect the presence of drawings or writings in a video frame relative to the specialized target; and examining the drawing or writing in the plurality of video frames to determine whether a user marked the substrate.

14. The computer readable medium of claim 13 wherein a subsequent drawing is made by using the position of the target to find the location of the substrate suitable for drawing.

15. The computer readable medium of claim 14, wherein the process beginning with allowing the user to mark the substrate is repeated.

16. The computer readable medium of claim 13, wherein the steps of searching for the target in a plurality of video frames, locating the drawing in the video frame relative to the target, and examining the drawing in the video frame are repeated until a determination that the user marked the substrate is made.

17. The computer readable medium of claim 13, the computer readable medium further including computer readable instructions encoded thereon for remembering the relative positions of the target and drawings on the substrate.

18. An apparatus comprising:

an articulated robot arm for drawing a specialized target on a substrate and for drawing or writing secured to a base;

an image sensor for finding and recognizing the target; and a controller, having a storage medium, including a rule set to interact with a user and instructions to manipulate the robot arm, to receive and process an image from the image sensor;

to determine an action based on the rule set and the image; and to move the robot arm based on a determination of the image based on the rule set.

19. The apparatus of claim 18, wherein the specialized target is asymmetrical.

20. The apparatus of claim 18, wherein the relative positions of the target and a drawing on the substrate are remembered, and this information is used to locate the drawing in the video frame relative to the target.

21. The apparatus of claim 18, wherein the robot arm comprises a plurality of software-controlled mechanical actuators and sensors.

22. The apparatus of claim 18, wherein the image sensor is a digital video camera that provides video to the controller.

* * * * *